(12) United States Patent
Andersson et al.

(10) Patent No.: US 7,877,515 B2
(45) Date of Patent: Jan. 25, 2011

(54) IDENTITY ASSIGNMENT FOR SOFTWARE COMPONENTS

(75) Inventors: Per Andersson, Montreal (CA); Jon Paul Maloy, Montreal (CA); Suresh Krishnan, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 241 days.

(21) Appl. No.: 12/124,633

(22) Filed: May 21, 2008

(65) Prior Publication Data

US 2009/0292712 A1    Nov. 26, 2009

(51) Int. Cl.
*G06F 17/30*    (2006.01)
(52) U.S. Cl. ............. 709/245; 709/217; 709/203
(58) Field of Classification Search .......... 709/245, 709/217, 203; 714/4, 5; 717/120–123
See application file for complete search history.

(56) References Cited

U.S. PATENT DOCUMENTS 6,173,313 B1 * 1/2001 Klots et al. ............ 709/203
6,915,296 B2 * 7/2005 Parson ..................... 1/1
7,054,927 B2 * 5/2006 Ulrich et al. ............ 709/223
2006/0004791 A1   1/2006 Kleewein et al.

FOREIGN PATENT DOCUMENTS

WO    0186427 A2    11/2001

OTHER PUBLICATIONS

International Search Report from corresponding PCT Application No. PCT/IB2009/052124.

* cited by examiner

*Primary Examiner*—Wing F Chan
*Assistant Examiner*—Ruolei Zong
(74) *Attorney, Agent, or Firm*—Alex Nicolaescu; Ericsson Canada Inc.

(57) ABSTRACT

Devices, systems, methods and software are described which provide identity assignment and redistribution capabilities for software components of a distributed application. Identity value ranges can be fixed or variable. Identity assignment schemes according to exemplary embodiments facilitate the continuation of traffic between the components and clients during redistribution of the identities.

20 Claims, 15 Drawing Sheets

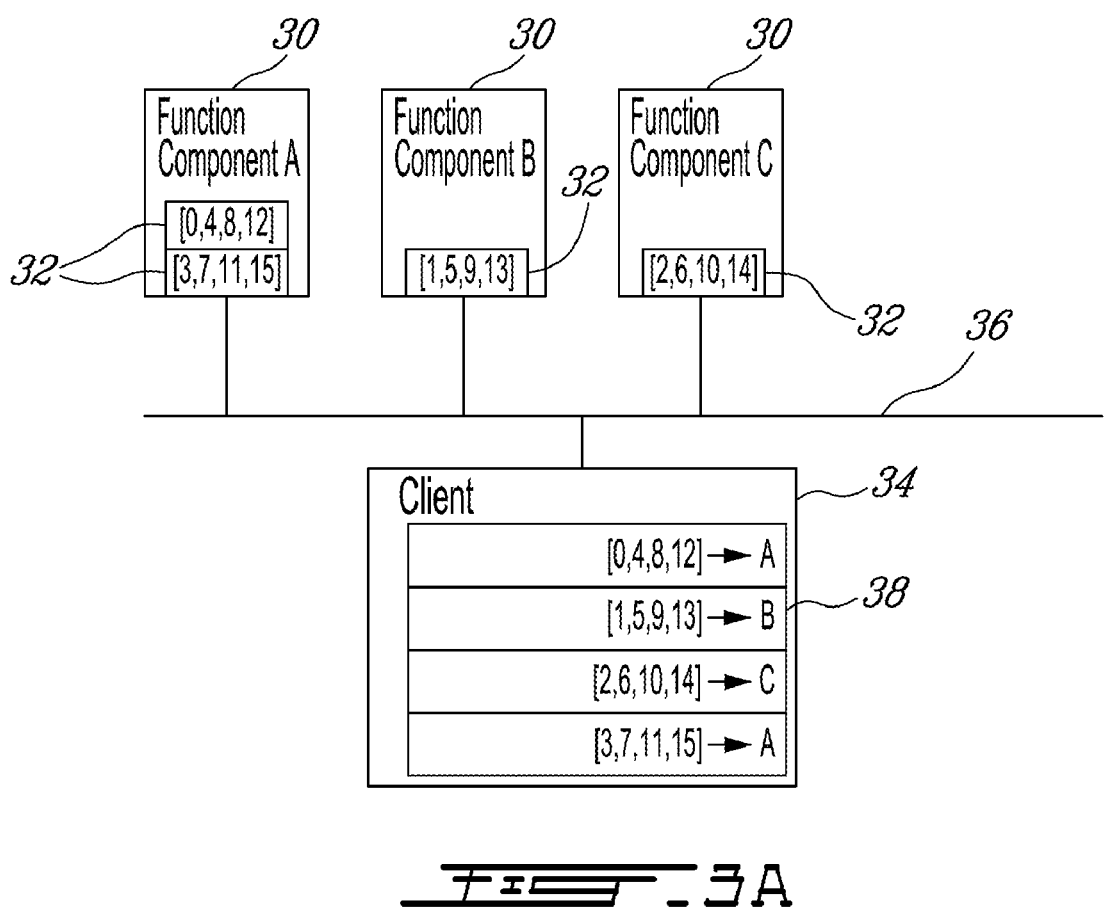

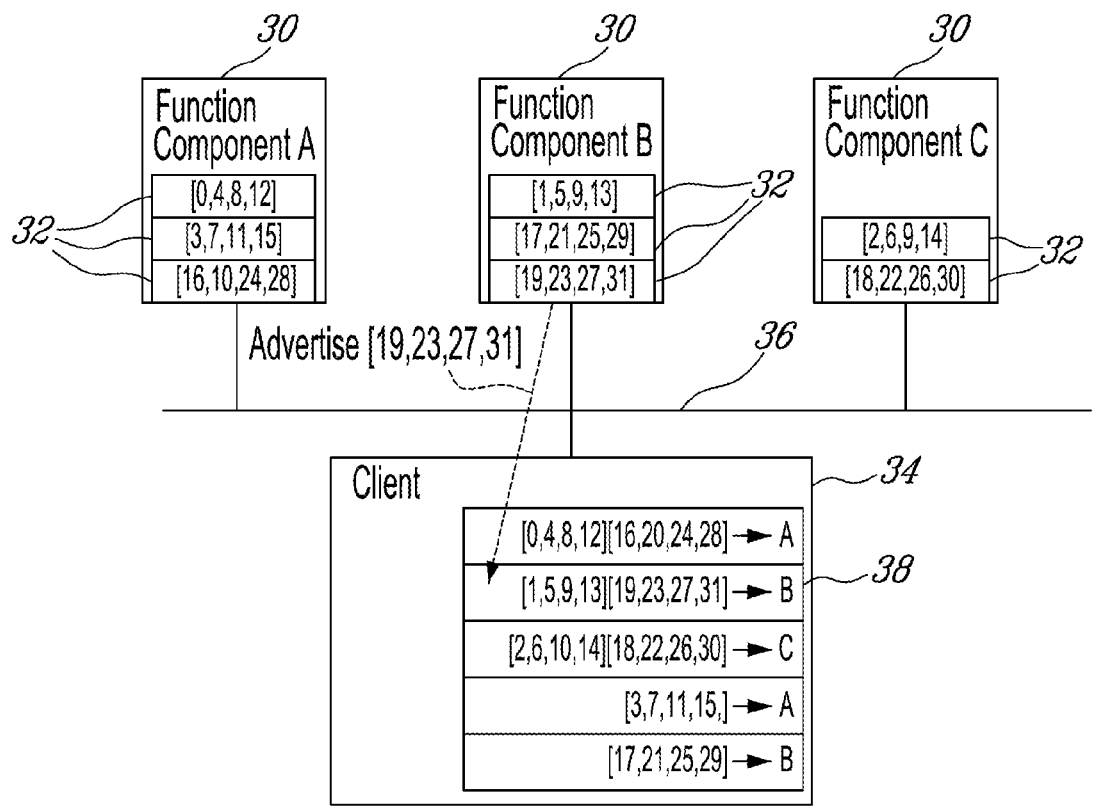

IDENTITY ASSIGNMENT FOR SOFTWARE COMPONENTS

TECHNICAL FIELD

The present invention generally relates to data processing systems and methods, devices and software and, more particularly, to mechanisms and techniques for assigning identities to software components.

BACKGROUND

Most software applications are physically or logically split into separate components, which components need to intercommunicate via some communication protocol when the applications are executed. In order to achieve this intercommunication, each component needs to be able to identify other components, using some identity scheme. Such identity types are often application specific, and typically differ from the addressing scheme provided by the communication protocol which is used.

Assigning functional identities to software components is an important task, since designers typically want to build desirable properties into the assignment scheme. For example, a designer may typically prefer that the assignment scheme enable the number of software components to be extendable or shrinkable, without affecting the clients' (which are often just other components of the same application) ability to send messages to the components. Moreover, the designer may want to control the distribution of traffic towards the components, e.g., because some components are running on more powerful CPUs than others. Additionally, the designer may want to limit disturbances to the system during reconfiguration, e.g., state transfers between components, or usage of bandwidth and memory during advertisement of the identities.

A straightforward assignment scheme involves assigning a single identity to each software component 10, e.g., identity "0" to component A, identity "1" to component B, etc., as shown for example in FIG. 1(a). This assignment scheme is expandable, i.e., one could add a fifth component E (not shown in FIG. 1(a)) and provide component E with a new identity "4". However, the loss or removal of a component, e.g., component C in FIG. 1(a), results in a period of unavailability until all clients 12 have been updated about the loss (e.g., as shown in FIG. 1(b)). A weakness of this assignment scheme is that it is tightly bound to the physical topology of the network, rather than responding to the needs of the applications. The client 10 typically determines the destination identity of a software component by using a hash function, and such hash functions are simpler, easier to maintain, and faster, if the target value range (Ri) is a fixed, uninterrupted sequence of identities, preferably with a size which is an exponential of 2, instead of a single identity. There may also be other, e.g., application specific, reasons for wanting to have a specific number of identities for each software component. However, identity assignment schemes which tie the identity range of a software component to the current number (N) of such components do not provide a satisfactory solution in most cases.

Another identity assignment scheme is illustrated in FIG. 2(a). Therein, the number of identities (i.e., 11) is much larger than the number of software components 20 (i.e., 4), but remains constant as the number of software components 20 changes. That is, instead of simply removing or adding identities as in the assignment scheme of FIGS. 1(a) and 1(b), the assignment scheme of FIGS. 2(a) and 2(b) distributes their representation according to the desired (i.e., equal or weighted) load balance among the software components. For example, as shown in FIG. 2(a), a client 22 may initially address each component 20 using a first set of identities. However, if a component C is removed, then the identities are redistributed as shown in FIG. 2(b). If a designer using the assignment scheme of FIGS. 2(a) and 2(b) wants to provide for exactly equal distribution before and after a component loss, the optimal identity range is Ri=N*(N−1)), with N being number of components. Adding a new, fifth, software component to the system illustrated in FIGS. 2(a) and 2(b) would thus imply moving some of the existing identities to the new component 20. However, since ((4*(4−1))=12) is not divisible by five, an equal distribution of identities would not result. A designer could instead choose to set the fixed number of identities as Ri=((N+1)*N*(N−1)) to obtain an equal distribution even at five components, but would then run into the same problem if the number of software components reached seven.

Thus it will be appreciated that the identity assignment schemes discussed above may suffer from, for examples issues associated with scalability and/or traffic continuity during a redistribution of identities. Accordingly, it would be desirable to provide systems, methods, devices and software for assignment of identities to software components which avoid the afore-described problems and drawbacks.

SUMMARY

According to one exemplary embodiment, a method for assigning identities to components of a software application includes assigning a plurality of identities to each of the components, and redistributing the identities while continuing to permit traffic between the components and one or more clients.

According to another exemplary embodiment, a processing node for assigning identities to components of a software application includes at least one processor configured to assign a plurality of identities to each of the components and to redistribute the identities while continuing to permit traffic between the components and one or more clients, and a memory for storing the redistributed identities in a table.

According to still another exemplary embodiment, a computer-readable medium contains program instructions stored thereon which, when executed by a computer or processor, performs the steps of assigning a plurality of identities to each of the components, and redistributing the identities while continuing to permit traffic between the components and one or more clients.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 3(a)-3(h) illustrates an identity assignment scheme according to an exemplary embodiment;

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1A:
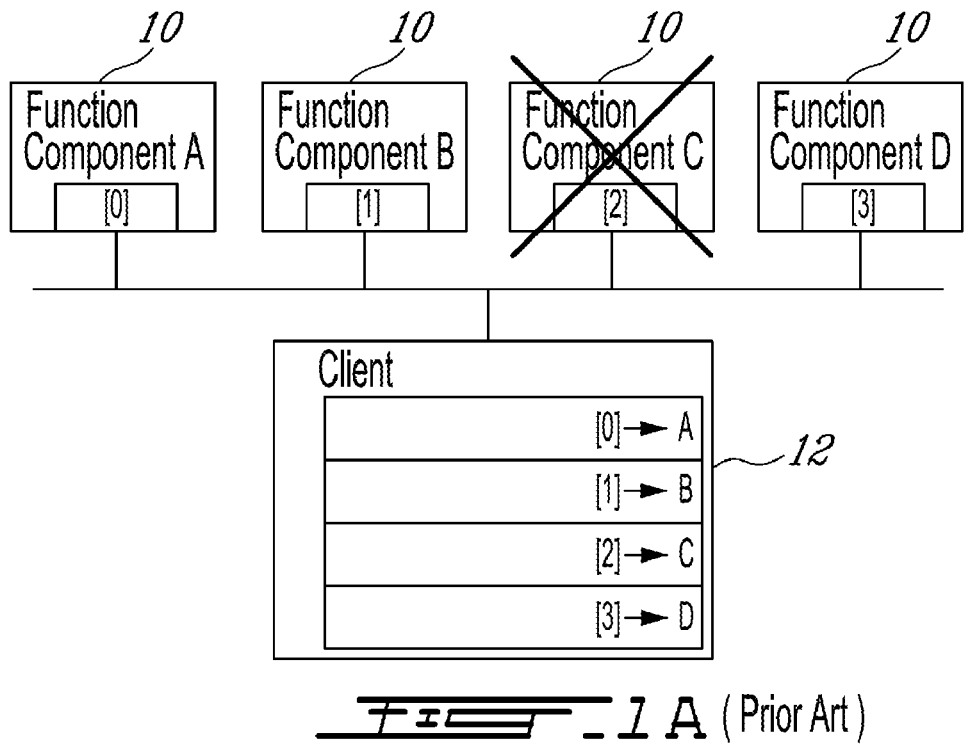
FIGS. 1(a) and 1(b) illustrate a first conventional identity assignment scheme.
Figure 1B:
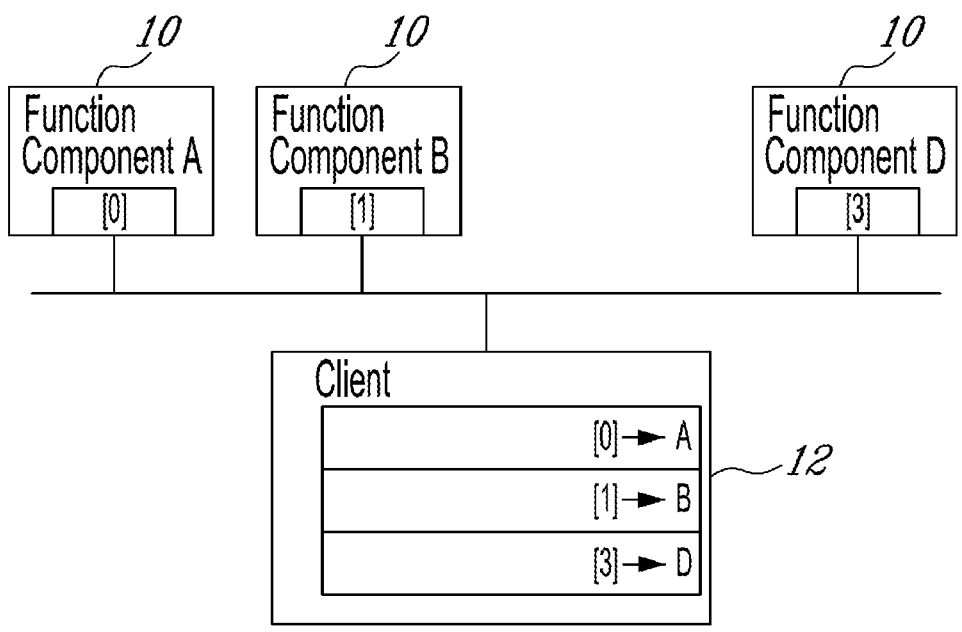
Figure 2A:
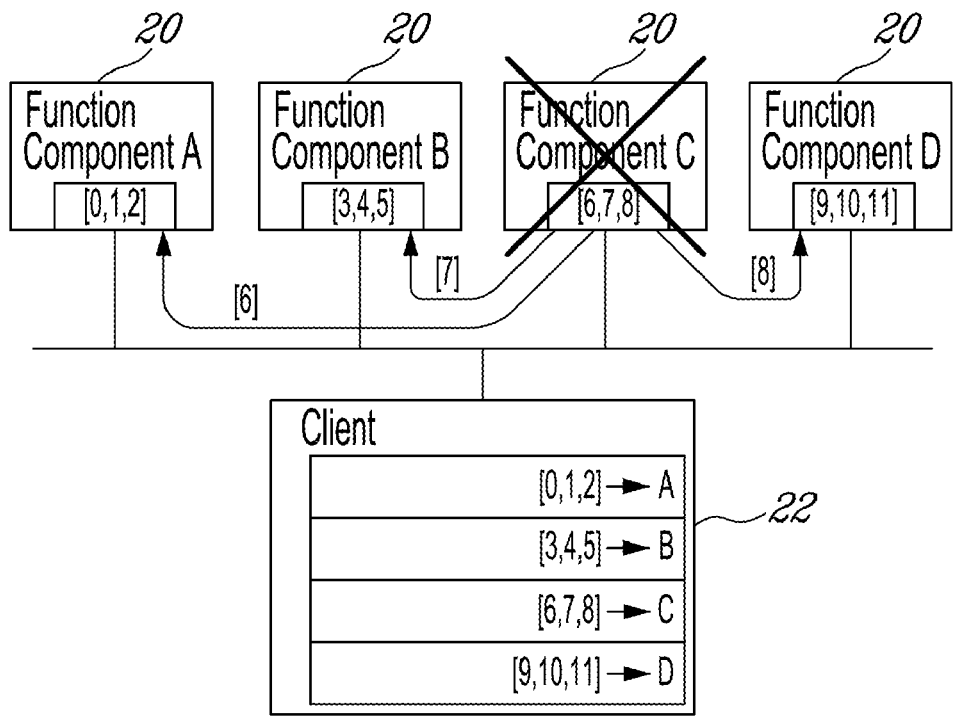
FIGS. 2(a) and 2(b) illustrate a second conventional identity assignment scheme.
Figure 2B:
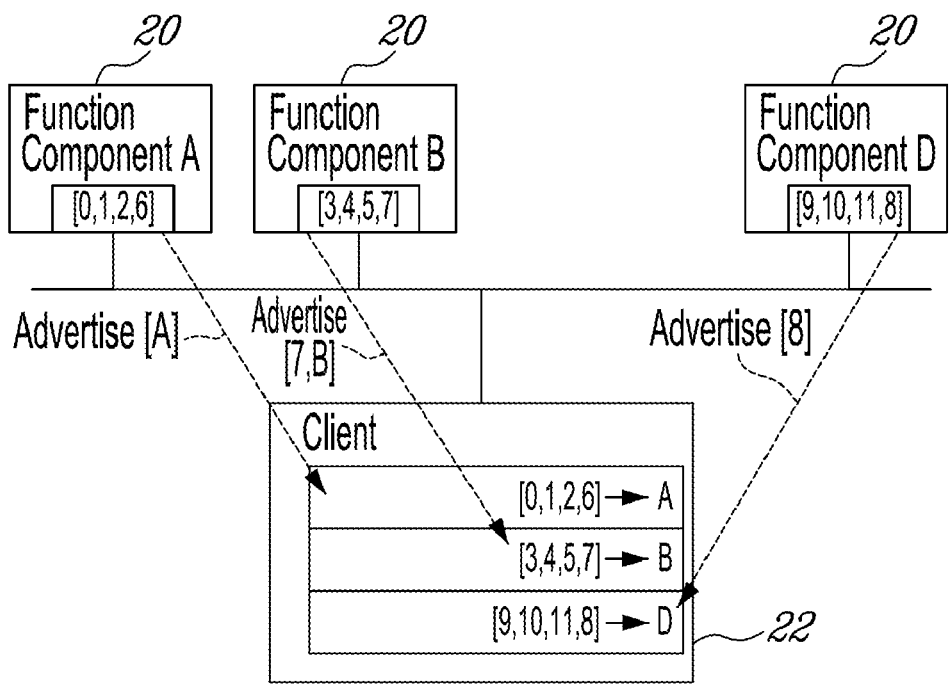

As suggested above, one problem with the assignment scheme illustrated in FIGS. 2(a) and 2(b) is that the number of identities must be chosen to be much bigger than even the largest conceivable number of components. Distributed software applications are most often written in a generic way, i.e., they are expected to work equally well with only a few software components or with thousands of software components, so such a fixed number of identities may end up to be very large. However, the provision of a very large, fixed number of identities in a component identity assignment scheme leads to a waste of memory and bandwidth in data processing systems. For example, the tables needed to keep thousands of identities may become excessively large, as may the bandwidth needed to keep these tables updated at any time. Instead, according to the following exemplary embodiments, assignment schemes are described which permit easy, dynamic, expansion of the identity space, with minimal impact on the client application or, alternatively, which minimize table sizes if a fixed, large, value range is to be used for the identities.

According to a first exemplary embodiment, an identity assignment scheme is provided which drastically reduces the problems described above, while retaining the basic properties of simplicity and scalability. According to this exemplary embodiment an $R_i \gg N$ distribution pattern is provided with a dynamic (variable) value range that can be accommodated by improving the hashing algorithm on the clients. Thus, unlike the identity assignment schemes described in FIGS. 1(a)-2(b), the number of identities associated with a given system or application is not fixed but can instead vary over time due to, e.g., changing workload assignments among the various software components.

FIG. 3(a) provides an example of an identity assignment scheme according to this first exemplary embodiment. Therein, the number Ri of identities (in this purely illustrative example equal to 16), is much bigger than the number N of components 30 (in this purely illustrative example equal to 3). According to some exemplary embodiments, a component 30 can be considered to be any addressable functional entity, e.g., a physical or logical (e.g., running on a virtual machine) computer or processing entity including, for example, a server which is associated with an identity distribution scheme. According to this exemplary embodiment, the identities are grouped into a number Rc of equal-sized containers 32, e.g., Rc=2n (in this purely illustrative example n=2). These containers 32 are then distributed among the components 30 to provide a number of identities for each component 30. More specifically, each container 32 thus contains Ri/Rc identities such that the components 30 are provided with either Ri/Rc identities or Ri/Rc *2 identities as shown, which identity values start from a base identity value Ib, and increase at an interval $M=2^m$ (in this purely illustrative example m is equal to 2). The base identity value Ib for each container 32 is thus increased in steps of 1, starting from 0.

According to exemplary embodiments, the number of identities in the identity space, Ri, is typically selected to be at least an order of magnitude bigger than the number of components 30, but small enough to keep table sizes and state transfers during reconfiguration to a reasonable minimum. The value for n can, for example, be selected as N<=Rc<=4N. The higher the value of n, the better the distribution of identities as will be seen in the following examples. The value for m can, for example, be expressed as comes out as a function of Ri and n, e.g., ($2^m$=Ri/Rc=Ri/(2*n)), such that the container size is a function of the number of identities and the number of containers. Ri and n are preferably selected so that m becomes an integer value. An exemplary interrelationship between these values for an identity assignment scheme according to this first exemplary embodiment can be expressed as:

$$R_{Ib,i} = \sum_{I_b=0}^{R_c-1} \sum_{i=0}^{R_i/R_c-1} I_b + i \cdot M \qquad (1)$$

Figure 3B:
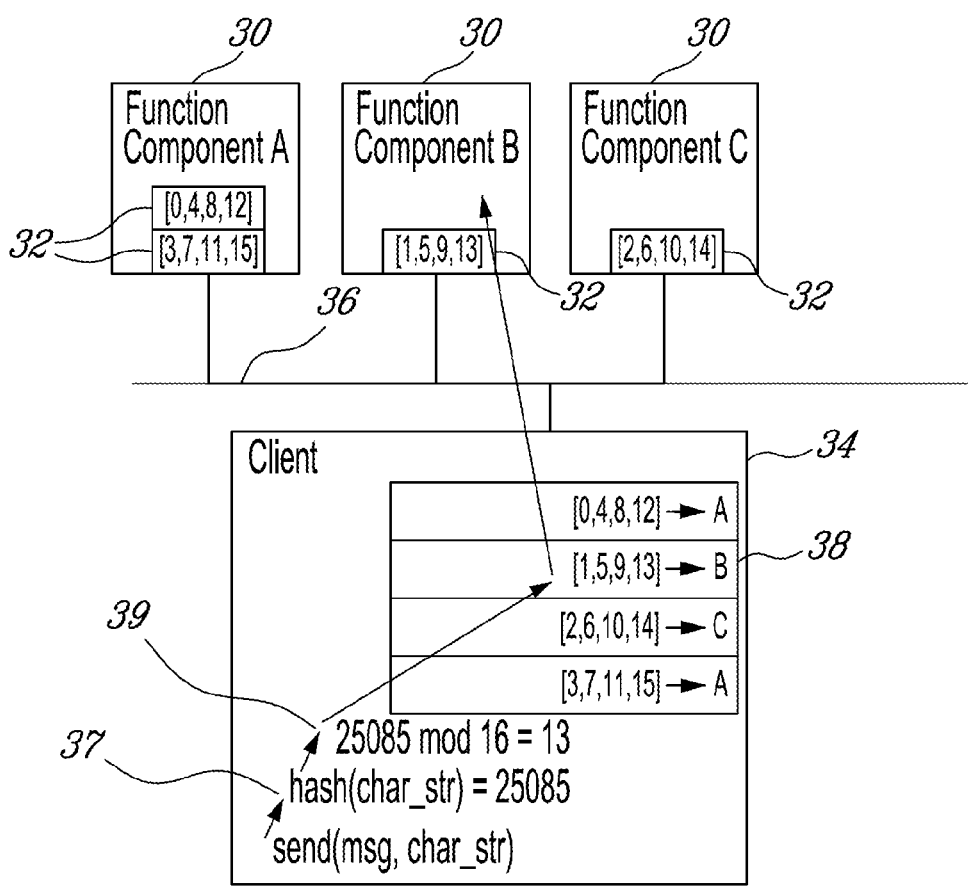

Once distributed, those components which have new identities associated therewith can advertise (broadcast) their new identities via a communication interconnect 36 (e.g., bus, pipeline, etc.) so that client(s) 34 can store the correlation between the new identities and that component in a table 38. According to some exemplary embodiments, a client 34 can also be considered to be any addressable functional entity, e.g., a physical or logical (e.g., running on a virtual machine) computer or processing entity including, for example, a server which is associated with an identity distribution scheme, that uses services provided by the component(s) 30. The client 34 uses its stored version of the current mapping between identities and components 30 to select a particular component 30 to receive, e.g., an outgoing message. For example, as shown in FIG. 3(b), the client 34 can perform a hash function 37 on a received character string in order to map that string down to a fixed value, e.g., a 16 or 32 bit value. The character string used for the hash function can, for example, be any string (e.g., an octet string) which yields a reasonably good distribution result for the hash function 37, e.g., a Session Initiation Protocol (SIP) Uniform Resource Identifier (URI), an IPv6 address, a telephone number in text format, etc. The output of the hash function 37 can then be further mapped down to a value which is within the current range of identities stored by the client 34 as shown by step 39. According to this exemplary embodiment, the second step down function 39 can be parameterized, due to the variable size of the identity value range, e.g., using a variably valued modulo-operation or bit mask operation. For example, in the illustrated identity selection shown in FIG. 3(b), this parameter is set to 16 since that is the number of identities currently being used by the identity assignment scheme. However, more generally, step 39 can be expressed as: (output of hash function 37) mod Ri. The result of step 39 is then an identity which is translated into a component address by the client 34, and the message associated with the received character string or other addressing information is then sent to that component 30 (in this example component B).

During the lifecycle of a software application having a number of different components 30 it may be desirable to increase the number of identities which are used to identify those components 30, e.g., in order to prepare for a redistribution of identities associated with an anticipated change in the relative workloads of the various components 30. This can be accomplished by multiplying the global identity space Ri by, for example, a factor of two, which implies that each component 30 shall double the size of its containers 32 and add the new identity values to those containers which were created to reach the new identity value limit. An example of identity number expansion according to this exemplary embodiment for the identity assignment scheme of FIG. 3(a) is shown as FIG. 3(c). Immediately after the identity expansion, some client functions may not be informed about the new identity limit and, therefore, those client functions will continue to use the old Ri value to send messages. Typically this will pose no difficulty as the messages will still reach the correct container 32. If, however, it is of importance for a particular application that messages or calls immediately go to the correct (new) identity, then the output of the hash function 36 can be sent along with the message to the component 30 which is identified as part of the identity selection process described above with respect to FIG. 3(b). The receiving component 30 can then re-map the hash value onto the new (expanded) identity value range so that the message will be associated with both the correct container 32 and the correct identity value within that container 32.

The identity expansion described above with respect to FIG. 3(c) did not alter the identity distribution; instead this expansion facilitates subsequent redistribution of the identities if and when redistribution becomes necessary. As mentioned above, quite often the reason for performing an identity expansion is to prepare for a redistribution of work load among the components 30. Accordingly, an example of identity redistribution according to this exemplary embodiment will now be described with respect to FIG. 3(d). Initially, the containers 32 are split. Since the number of containers 32 is an exponential of two, and all of the containers 32 are of the same size (i.e., have the same number of identities), each container 32 should therefore be split into two new, equally sized containers 32. Thus, considering the expanded identity assignment scheme of FIG. 3(c), the four containers 32 illustrated therein, each containing eight identities, are split into eight containers 32 in FIG. 3(d), each containing four identities. These new containers 32 can then be distributed among the existing components 30 in any desired pattern. FIG. 3(d) provides a relatively even 3-3-2 distribution among the three components 30 as a purely illustrative example. Note that the new identities associated with, e.g., component B, can be advertised or broadcast on a bus or other communications interconnect 36 (software or hardware) so that the client(s) 34 can be informed of the changes in the identity assignment scheme. The resulting mapping scheme is then stored in client 34 (as well as any other client functions 34 which use these components 30). In addition to expanding the identity space for the purpose of redistributing identities among existing components, it will be appreciated that the same techniques described above with respect to FIGS. 3(c) and 3(d) can be used when a new component 30 is added to the system to enable that new component 30 be assigned an appropriate number of identities/containers.

Moreover, expanding the identity space according to this exemplary embodiment may also be a preparative step for removing one or more components 30 from a system. For example, if an odd, low number of components 30 currently exists in a given identity assignment scheme according to these exemplary embodiments, it may be difficult to obtain a fair distribution of identities unless there are a sufficient number of containers 32. To illustrate this point, consider first the exemplary component removal scenario shown in FIGS. 3(e) and 3(f). Initially, as shown in FIG. 3(e), four containers 32 each having four identities are distributed equally among four components 30. Then, component D is removed and the containers are redistributed as shown in FIG. 3(f), i.e., in a 2-1-1 proportion among the three remaining components 30. If, however, there were more containers 32 available at the time the component D was removed, then a fairer distribution of those containers could be performed (if desired). This point is, for example, shown in the scenario of FIGS. 3(g) and 3(h). In FIG. 3(g), like FIG. 3(e), the system has four components 30 each with a single container 32 (albeit with a greater number of identities per container). However when component D is removed in this scenario, the containers 32 are first split before redistribution, enabling the resulting eight containers 32 to be redistributed in the illustrated 3-2-2 pattern, i.e., more evenly balancing the number of identities per component than in the scenario illustrated in FIGS. 3(e) and 3(f).

The foregoing exemplary embodiment permits the ready expansion or contraction of the identity space through the use of a variable number of identities grouped into logical containers. Expansion or contraction of the identify space can be performed with minimal effect on the client applications, e.g., traffic can continue to be sent by the client(s) 34 to the component(s) 30 during the same time that the identity space is being expanded or contracted. Scalability according to these exemplary embodiments also comes with the capability to create and maintain an optimal load distribution profile, e.g., with respect to user traffic profiles and/or the number of server component. Alternatively, however, other exemplary embodiments provide for scalability and minimal impact on client operations using a fixed number of identities as will now be described with respect to FIGS. 4(a)-4(i).

Figure 4A:
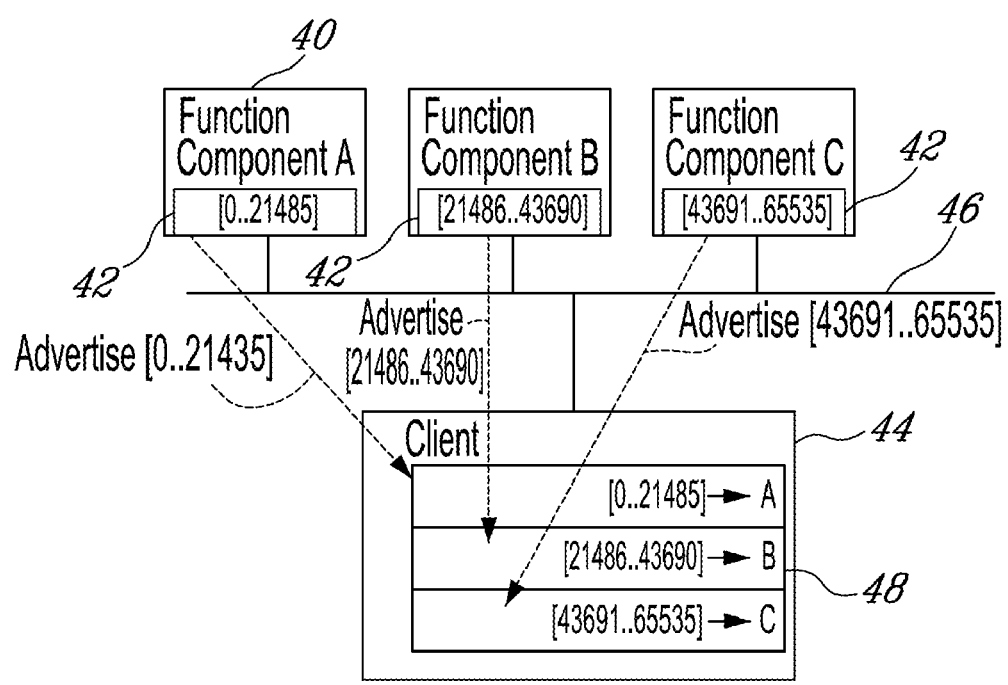
FIGS. 4(a)-4(i) depicts an identity assignment scheme according to another exemplary embodiment.

Like the previous exemplary embodiment, this exemplary embodiment uses a number of identities Ri which is much greater than a number N of components being addressed, however the identity range Ri is fixed rather than variable. This, in turn, permits a fixed (i.e., non-parameterized) hashing function to be used by a client to select a target identity for delivery of an outgoing message. This exemplary embodiment manipulates, advertises and stores identity sequences, handled as, for example, an [upper_limit . . lower_limit] tuple, instead of individual identities grouped in containers. FIG. 4(a) provides an example of identity assignment according to this second exemplary embodiment. Therein, the number of identities Ri (equal to 65636 in this purely illustrative example), is much bigger than the number N (equal to three in this purely illustrative example) of components 40. The identities are grouped into N sequences 42, which sequences 42 are then distributed among the components 40. Each sequence 42 covers a portion of the identity space, the portion size being based on the amount of the traffic load that a designer wants the corresponding component 40 to handle.

Figure 4B:
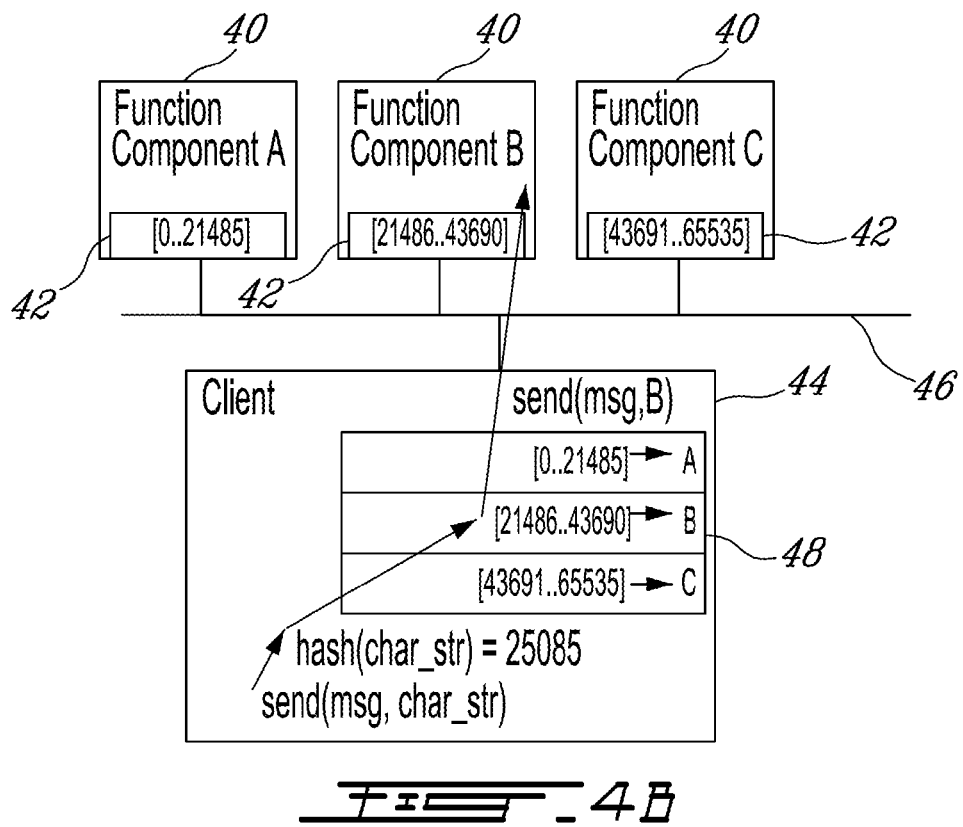
Figure 4C:
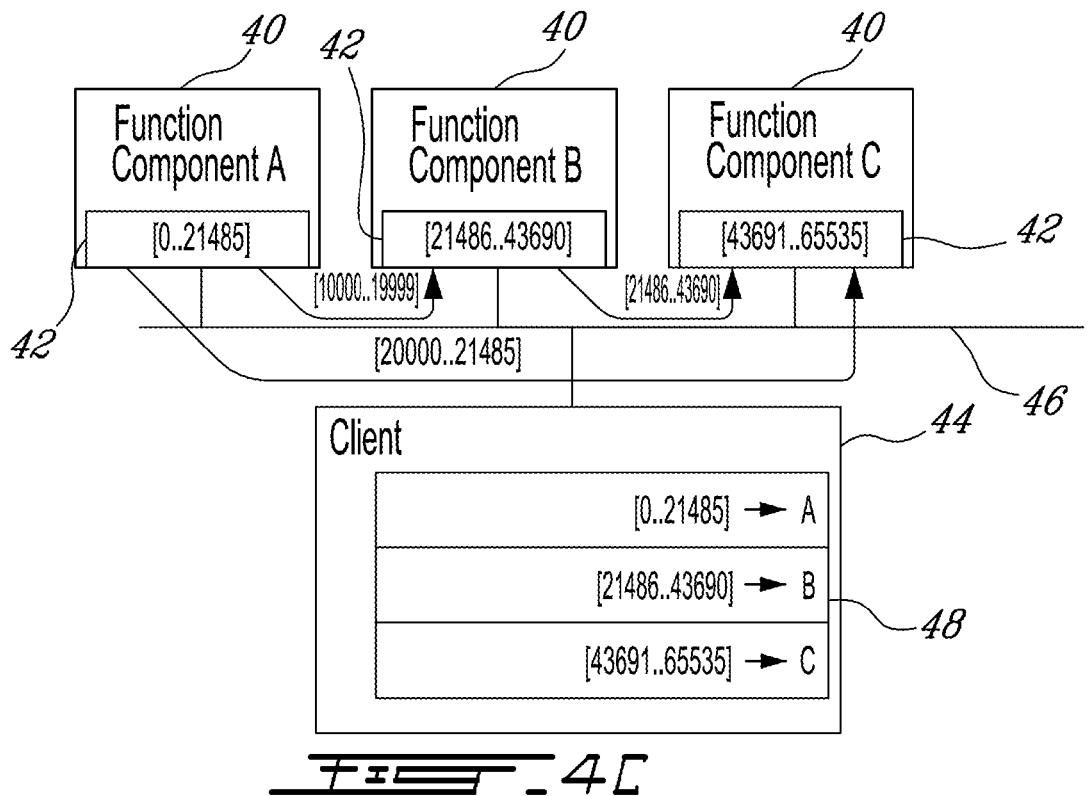
Figure 4D:
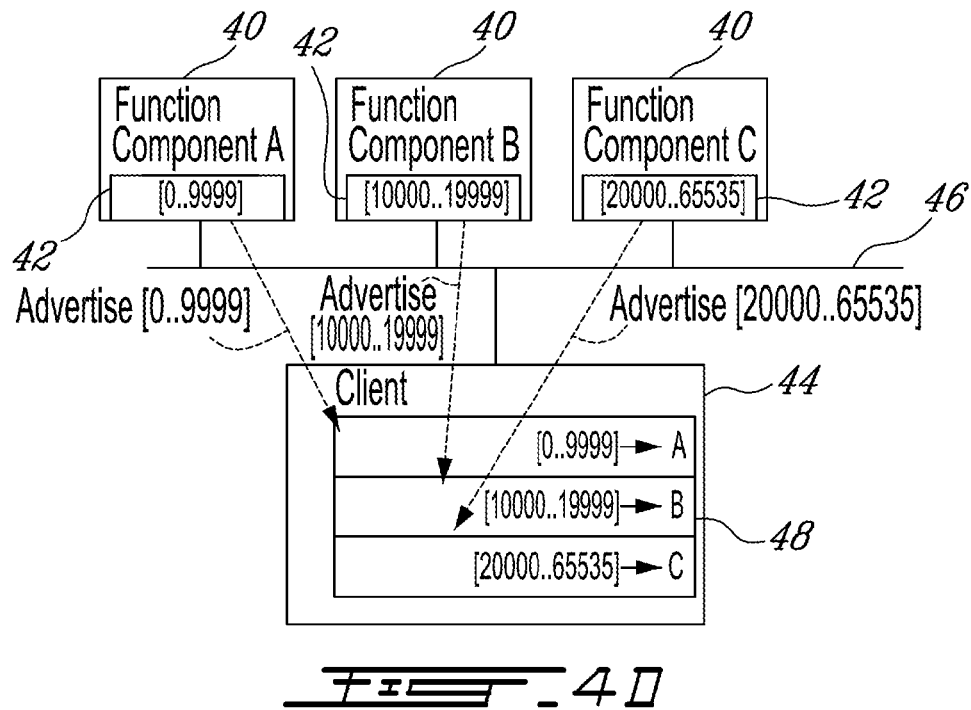
Figure 4E:
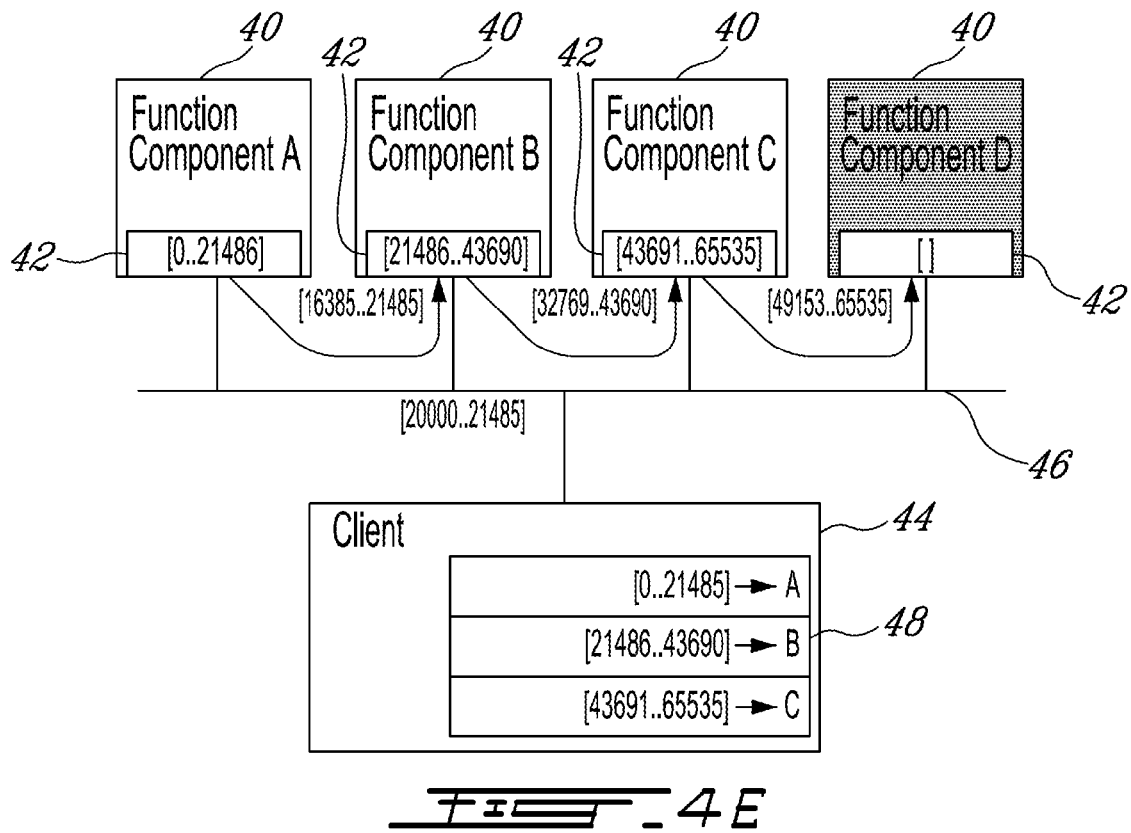

Selection of a particular identity among those in the identity space for delivery of a message or call from a client 44 to a respective component 40 can be performed as shown, for example, in FIG. 4(b). Therein, a hash function 46 is performed on, e.g., a character string, in order to map the character string down to the identity range Ri. The value for Ri can, for example, be selected as an exponential of two, e.g., to fit into a 16 or 32 bit integer value. After the hash operation is performed the resulting identity can be directly translated into a component address, and the message is then sent to that component 40. Note that since, for this exemplary embodiment, the identity range Ri is fixed, the step 38 which performs a parameterized modulus operation is not needed.

Equal load balancing between the components 40 may not always be desirable. For example, one component 40 may be running on a more powerful CPU than the other components, and hence can handle more traffic. Additionally, the traffic distribution itself, with regard to the identities used, may also be unbalanced, leading to a desire to compensate for the imbalance. This compensation can be performed by redistributing the identities among the components 40 which, for this exemplary embodiment, means shrinking some sequences 42 and expanding other sequences 42. An example of identity redistribution for this exemplary embodiment is illustrated in FIGS. 4(*c*) and 4(*d*). Therein, each component 40 initially has a sequence 42 with a roughly equal number of identities therein, representing a generally balanced workload between the three components. If component C is anticipated to acquire a dramatically increased workload, the identities can be shifted from one sequence 42 to another sequence 42 by the node or entity which is managing the assignment scheme as shown, for example, in FIG. 4(*c*), with the resulting sequences 42 then being shown in FIG. 4(*d*). Each component can advertise its new sequence range to the client(s) 44, e.g., via a bus or other communication interconnect 46, which clients will then store the new sequences 42, e.g., in a table 48 in a memory device (not shown in FIG. 4(*d*), see FIG. 5), for future message mappings.

One or more new components 40 can be added using the identity assignment scheme of FIG. 4(*c*), without affecting the client 44's function and, in particular, while permitting continued traffic between the client 44 and the components 40 during the time that the new component 40 is being added. FIGS. 4(*e*) and 4(*f*) provide an example of how an identity assignment scheme according to this exemplary embodiment can re-balance traffic after having added a new component D. As in the previous example for redistributing identities within each component 40's sequence 42, a number of identities are shifted from a previous assignment to one component 40 to a new assignment to another component 40 as shown in FIG. 4(*e*). In this example, the rebalancing is performed with an emphasis on keeping the size of tables 48 as small as possible as shown in FIG. 4(*f*), i.e., by keeping the advertised sequences 42 consecutive, at the expense of accepting more state transfer between the components. Those skilled in the art will appreciate that, of course, other distributions of the identities among the components 40 are possible, e.g., if the primary consideration was to minimize state transfers and the interval of disturbances that is an effect of such state transfers.

Similarly, removal (or loss) of a component 40 can be handled according to this exemplary embodiment as shown in FIGS. 4(*g*)-4(*i*). In this example component D is removed or lost and rebalancing is performed with the objective of minimizing state transfers, so that the cluster can quickly re-enter a steady state with well balanced traffic. As illustrated by the presence of one sequence 42 per component in FIG. 4(*g*) and two sequences per component in FIG. 4(*h*), this rebalancing strategy leads to increasingly fragmented translation tables 48, especially if there are repeated cycles of additions and/or removals. Accordingly, it may be useful to perform a consolidation phase on the sequences during a period of low load of the payload application, in order to restore the condition wherein the components 40 have single and consecutive sequences 42 as shown in FIGS. 4(*h*) and 4(*i*).

The exemplary identity assignment scheme described above with respect to FIGS. 4(*a*)-4(*i*) provides for extreme scalability. Using this identity assignment scheme, it will be possible to dynamically add or remove thousands of components 40, or to rebalance traffic at any time with high accuracy and without affecting the functionality of the client applications. Additionally, identity assignment can be performed without ending up with excessive table sizes, since all table entries and advertisements according to this exemplary embodiment handle sequences 42 rather than individual identities.

Figure 5:
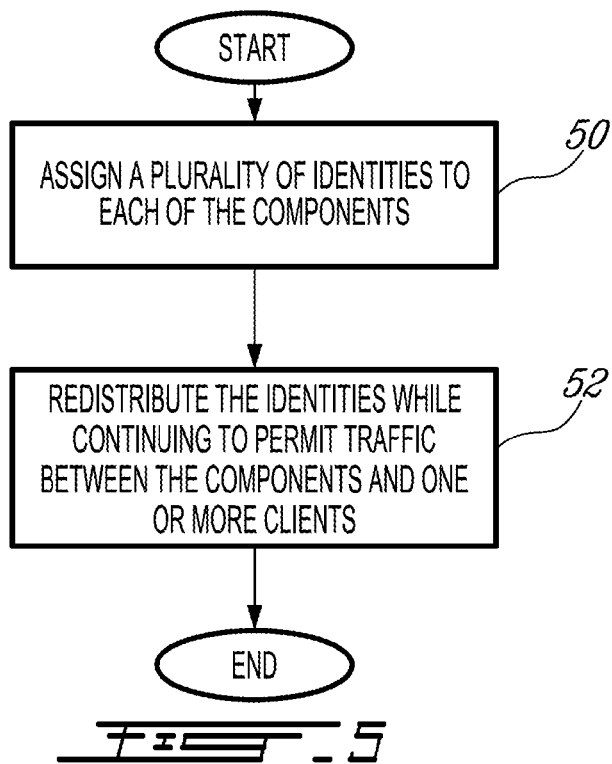
FIG. 5 is a flowchart illustrating a method for identity assignment according to exemplary embodiments.

A useful property of both of the identity assignment schemes as described above with respect to the exemplary embodiments of FIGS. 3(*a*)-4(*i*) is their ability to handle transition periods, i.e., periods when identities are moved between components 30, 40 and re-advertised, in such a way that traffic disturbances are minimal. In fact, identity assignment schemes according to these exemplary embodiments are designed to enable continued traffic between components 30, 40 and clients 34, 44 during such transition periods, i.e., without requiring that traffic be halted while redistributing identities. This quality of identity assignment schemes according to these exemplary embodiments is illustrated in the flowchart of FIG. 5, which illustrates a general method for identity assignment according to these exemplary embodiments. Therein, at step 50, identities are assigned to each of the components. Then, at step 52, the identities are redistributed while continuing to permit traffic between the components and one or more clients.

Since no state transfer is truly atomic, and since there will be a time interval before the new location of an identity is known by all of its users after it has been redistributed, an additional identity assignment feature can be provided. More specifically, according to exemplary embodiments, e.g., as an optional feature for either or both of the exemplary embodiments described above, each message can convey its calculated target identity. Hence, messages which are sent towards a certain component 30, 40 just after the corresponding identity was transferred to a different component 30, 40, but before the translation table 38, 48 on the sending component 30, 40 or client 34, 44 was updated, can be re-evaluated on the old target component 30, 40, and re-directed towards the new one. This will, for example, minimize traffic disturbances during a planned component addition/removal or a traffic rebalancing.

The exemplary embodiments described above, illustrate methods, devices, systems and software for handling assignment and redistribution of identities associated with components of a distributed application. Thus, some aspects of these exemplary embodiments can be implemented as software. Thus, the process or method steps associated with these exemplary techniques can be performed by one or more processors executing sequences of instructions (software) contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Figure 6:
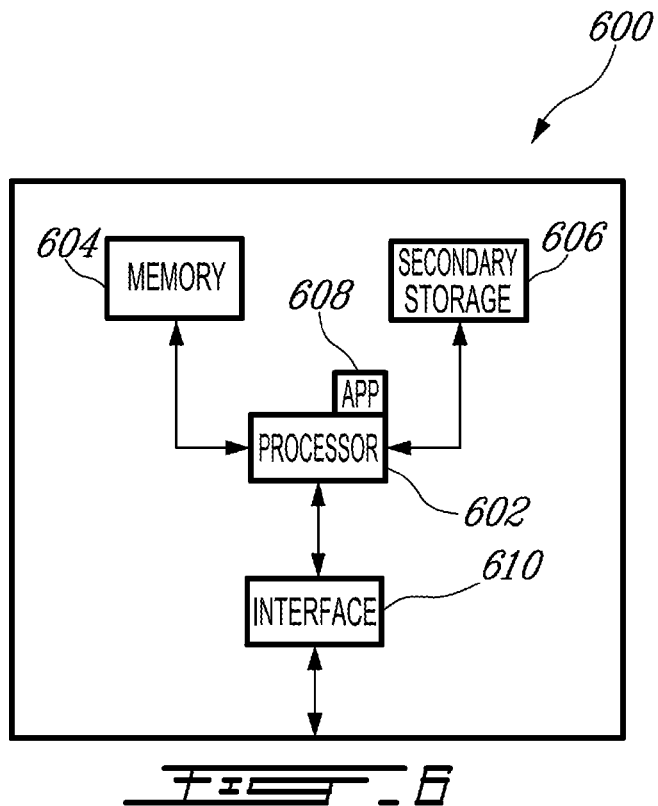
FIG. 6 shows a processing node which can be used to implement exemplary embodiments.

From a hardware perspective, the distributed application (including the software components 30, 40 and the clients 34, 44) may be running on one device, e.g., computer, server or the like, or on multiple devices. Scalable control planes are one example of a commercial product which may include these exemplary embodiments, but the present invention is by no means limited to implementation in scalable control planes but can be used in, for example, any distributed processing system including functional addressing of components. Although the particular hardware configuration on which identity assignment according to these exemplary embodiments is performed is arbitrary and implementation dependent, FIG. 6 illustrates an exemplary processing node on which some or all of the components 30, 40 and clients 34, 44 may be operating. Therein, processing node 600 can contain a processor 602 (or multiple processor cores), memory 604, one or more secondary storage devices 606, a software application 608 (or multiple applications, e.g., including the components 30, 40 and clients 34, 44) and an interface unit 610 to facilitate communications between node 600 and the rest of the network. The software application 608 in conjunction with the processor 602 and memory 604 can execute instructions for redistributing component identities as described above.

The foregoing description of exemplary embodiments provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method for assigning identities to N components of a software application, said method comprising:
   a) distributing a plurality of identities $R_{Ib,i}$ in a plurality of equal-sized containers $R_c$, according to a formula:

$$R_{Ib,i} = \sum_{I_b=0}^{R_c-1} \sum_{i=0}^{R_i/R_c-1} I_b + i \cdot M$$

wherein $I_b$ is a start identity value for a container and i is an index value for the identities of said container;
   $R_I$ being a total number of identities;
   M being a number of identities per equal-sized container;
   b) assigning said equal size containers to said components; and
   c) redistributing said identities while continuing to permit traffic between said components and one or more clients.

2. The method of claim 1, wherein $N<=R_c<=4N$.

3. The method of claim 1, wherein $2^M=R_I/R_c$.

4. The method of claim 1, wherein said step of assigning further comprises:
   assigning said equal size containers based upon a workload to be performed by each respective component.

5. The method of claim 1, further comprising the step of:
   consolidating, after redistributing said identities, multiple containers associated with a single component into a single container.

6. The method of claim 1, further comprising the step of:
   advertising a mapping of said redistributed identities to said plurality of components.

7. The method of claim 6, further comprising the steps of:
   storing said mapping of said redistributed identities to said plurality of components in a table which is accessible by said one or more clients;
   calculating a target identity for delivery of a message by one of said one or more clients; and
   selecting, by said one of said one or more clients, a component for delivery of a message using said calculated target identity and said stored mapping.

8. The method of claim 7, wherein said step of calculating further comprises:
   performing a hashing function on a character string; and
   said step of selecting further comprises:
   using an output of said hashing function to index said table and determine an address of said component for delivery of said message.

9. The method of claim 8, wherein said step of using an output of said hashing function further comprises:
   reducing a value of said output of said hashing function to be within a range of said plurality of identities by performing a modulo operation on said value of said output.

10. The method of claim 7, further comprising the step of:
    sending said message to said selected component including said calculated target identity.

11. A processing node for assigning identities to N components of a software application, said processing node comprising:
    at least one processor configured to distribute a plurality of identities $R_{Ib,i}$ in a plurality of equal-sized containers $R_c$, according to a formula:

$$R_{Ib,i} = \sum_{I_b=0}^{R_c-1} \sum_{i=0}^{R_i/R_c-1} I_b + i \cdot M$$

wherein $I_b$ is a start identity value for a container and i is an index value for the identities of said container;
    $R_I$ being a total number of identities;
    M being a number of identities per equal-sized container, to assigning said equal size containers to said components and to redistribute said identities while continuing to permit traffic between said components and one or more clients; and
    a memory for storing said redistributed identities in a table.

12. The processing node of claim 11, wherein $N<=R_c<=4N$.

13. The processing node of claim 11, wherein $2^M=R_I/R_c$.

14. The processing node of claim 13, wherein at least one processor assigns said equal size containers based upon a workload to be performed by each respective component.

15. The processing node of claim 11, wherein said at least one processor consolidates, after redistributing said identities, multiple containers associated with a single component into a single container.

16. The processing node of claim 11, wherein said components advertise their respective redistributed identities to said plurality of components and said one or more clients.

17. The processing node of claim 16, wherein said at least one processor calculates a target identity for delivery of a message by one of said one or more clients, and selects a component for delivery of a message using said calculated target identity and said stored mapping.

18. The processing node of claim 17, wherein said at least one processor performs a hashing function on a character string, and uses an output of said hashing function to index said table and determine an address of said component for delivery of said message.

19. The processing node of claim 18, wherein said at least one processor reduces a value of said output of said hashing function to be within a range of said plurality of identities by performing a modulo operation on said value of said output.

20. The processing node of claim 17, wherein said at least one processor sends said message to said selected component including said calculated target identity.

* * * * *

UNITED STATES PATENT AND TRADEMARK OFFICE
CERTIFICATE OF CORRECTION

PATENT NO. : 7,877,515 B2
APPLICATION NO. : 12/124633
DATED : January 25, 2011
INVENTOR(S) : Andersson et al.

Figure 3C:
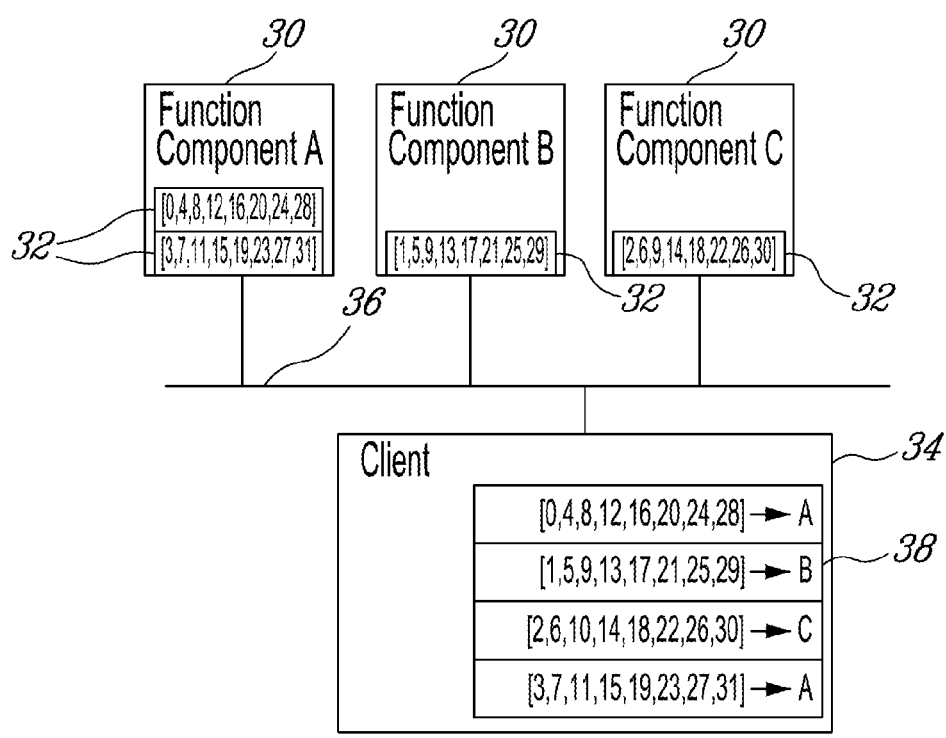
Figure 3E:
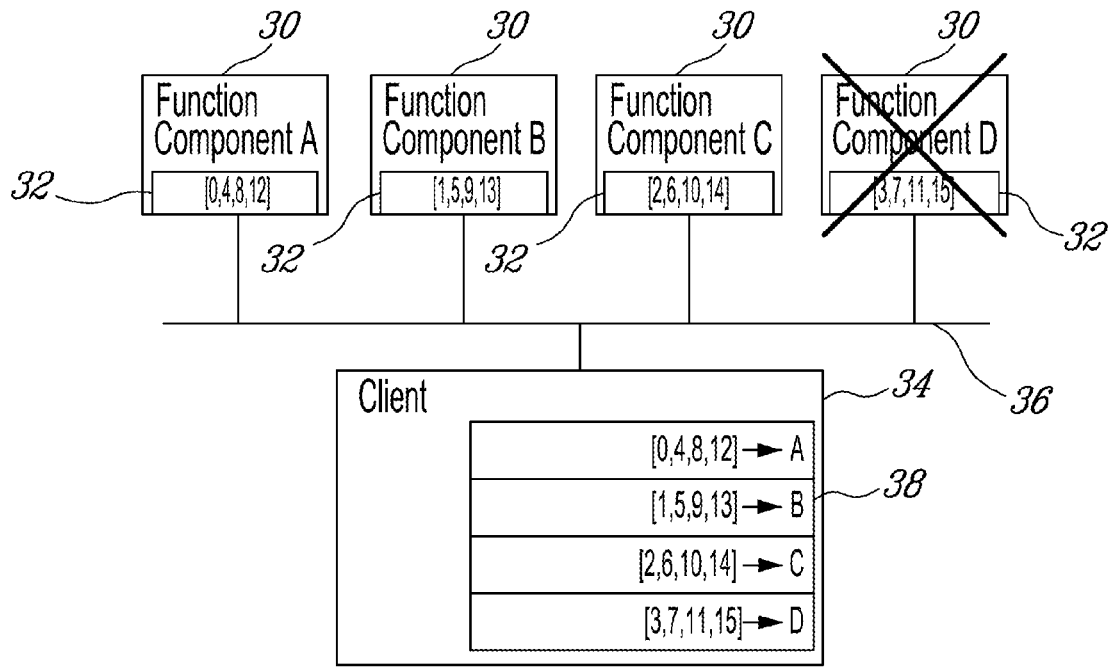
Figure 3F:
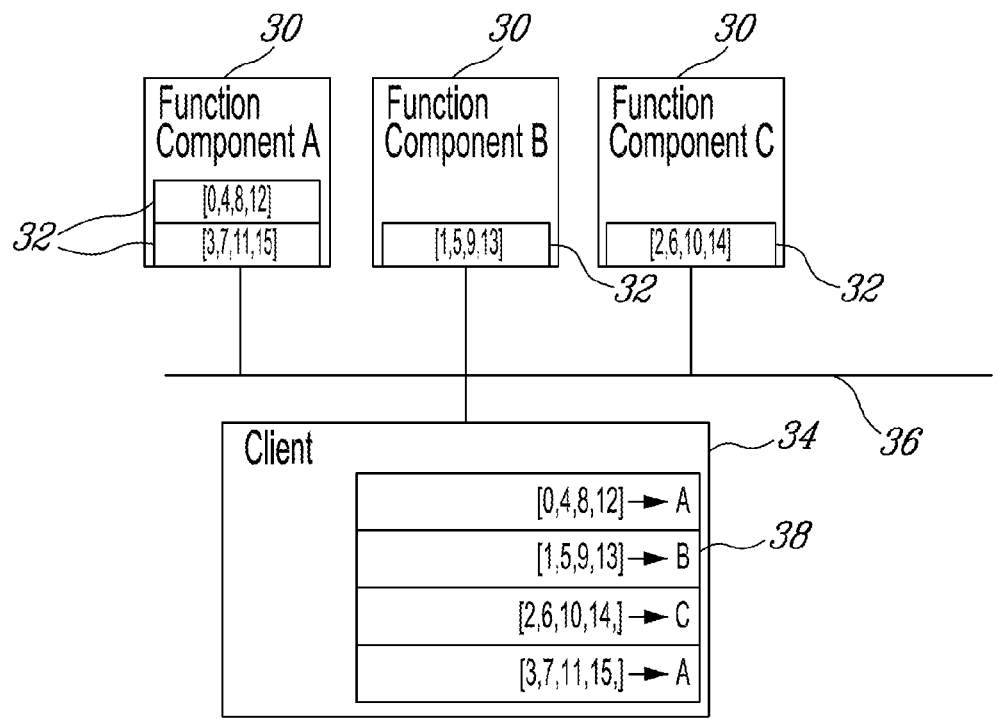
Figure 3G:
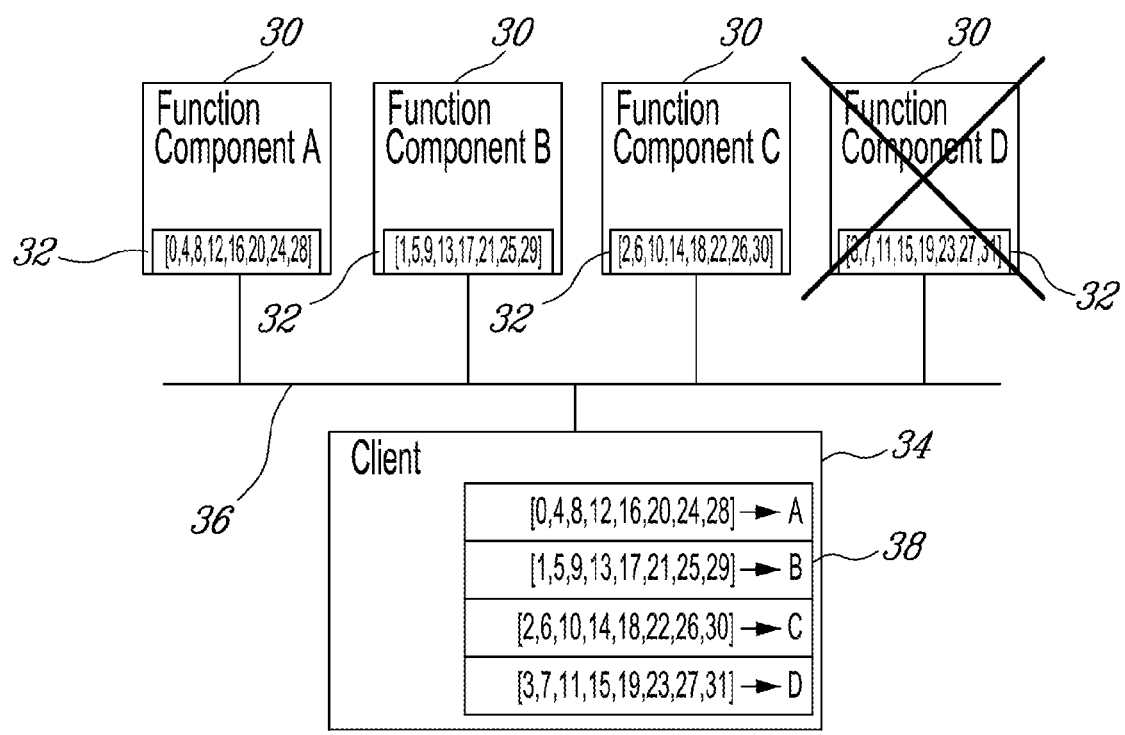

It is certified that error appears in the above-identified patent and that said Letters Patent is hereby corrected as shown below:

In Fig. 3C, Sheet 5 of 15, in "Function Component C", for Tag "32", Line 1, delete "[2,6,9," and insert -- [2,6,10, -- , therefor.

In Fig. 3D, Sheet 6 of 15, in "Function Component A", for Tag "32", Line 3, delete "[16,10,24,28]" and insert -- [16,20,24,28] -- , therefor.

In Fig. 3D, Sheet 6 of 15, in "Function Component C", for Tag "32", Line 1, delete "[2,6,9,14]" and insert -- [2,6,10,14] -- , therefor.

Figure 3H:
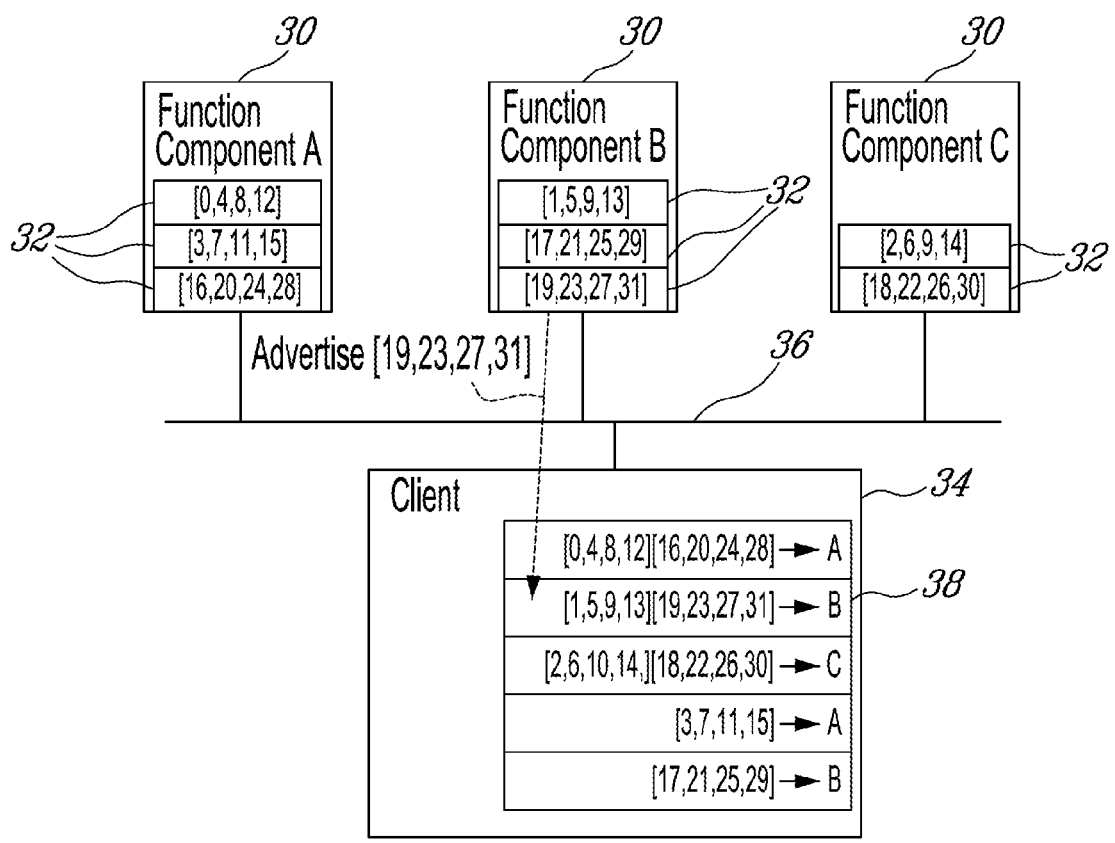

In Fig. 3H, Sheet 9 of 15, in "Function Component C", for Tag "32", Line 1, delete "[2,6,9,14]" and insert -- [2,6,10,14] -- , therefor.

In Fig. 4A, Sheet 10 of 15, delete " " and insert -- -- , therefor.

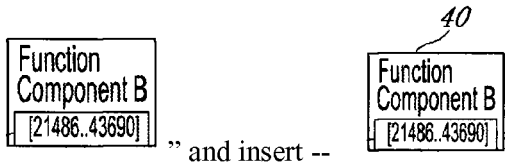

In Fig. 4A, Sheet 10 of 15, delete " " and insert -- -- , therefor.

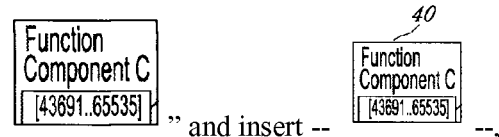

In Fig. 4A, Sheet 10 of 15, delete "Advertise [0..21435]" and insert -- Advertise [0..21485] -- , therefor.

Figure 4F:
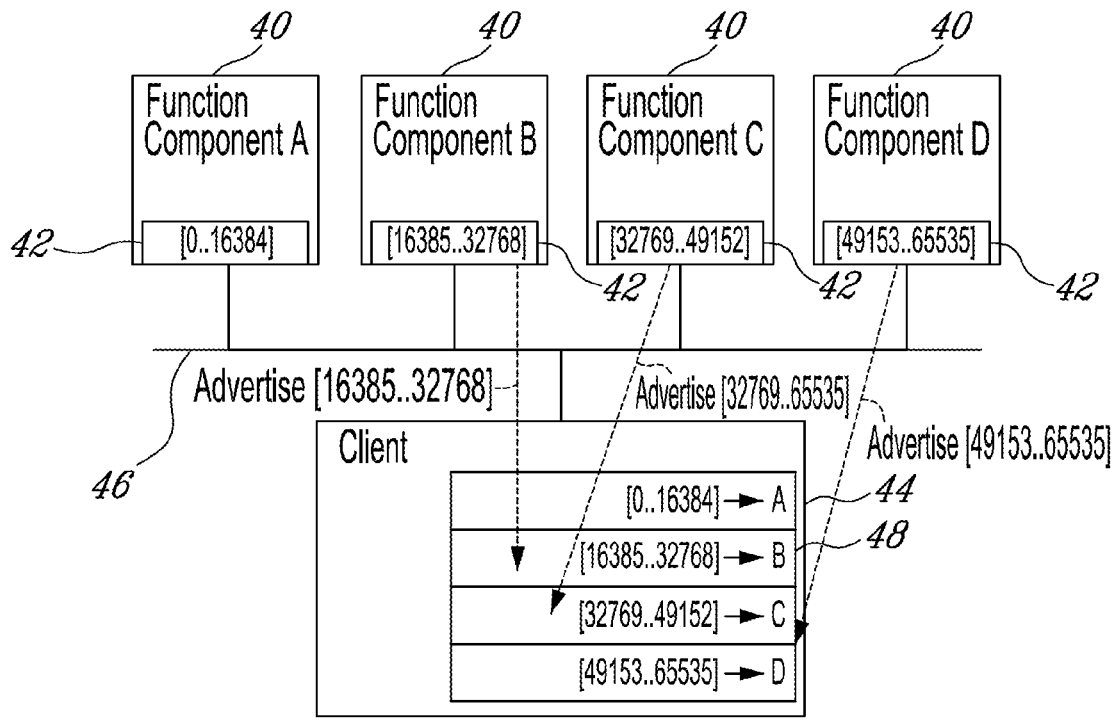
Figure 4G:
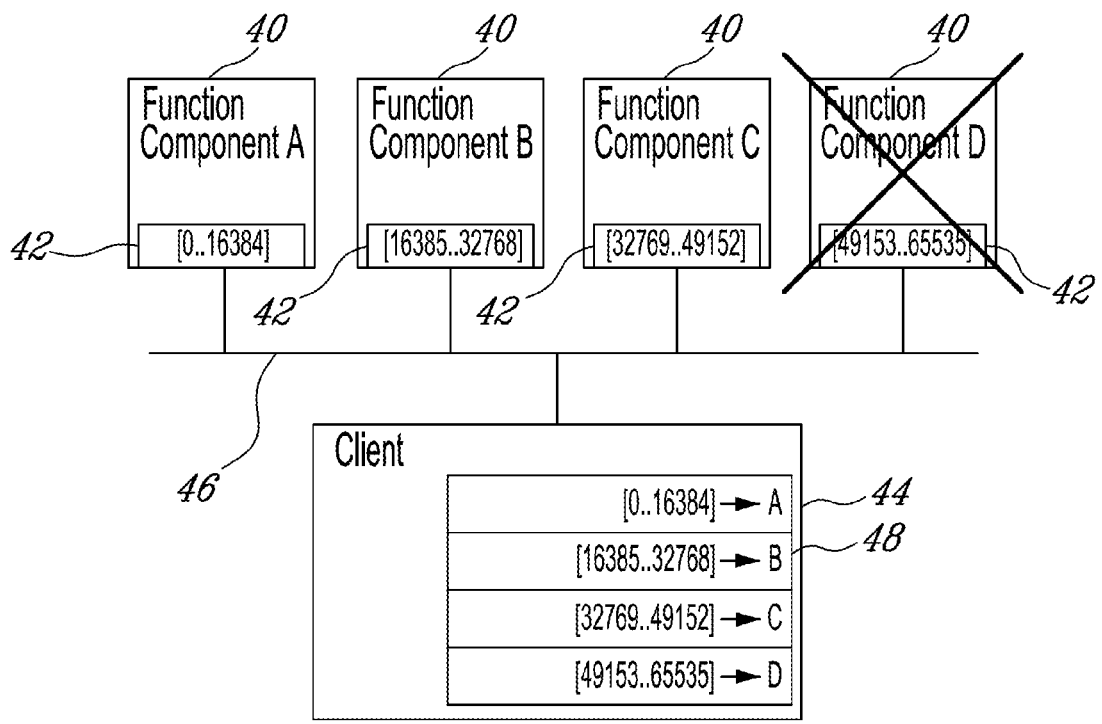

In Fig. 4F, Sheet 13 of 15, delete "Advertise [32769..65535]" and insert -- Advertise [32769..49152] -- , therefor.

Signed and Sealed this
Twenty-fourth Day of May, 2011

David J. Kappos
*Director of the United States Patent and Trademark Office*

CERTIFICATE OF CORRECTION (continued)
U.S. Pat. No. 7,877,515 B2

Figure 4H:
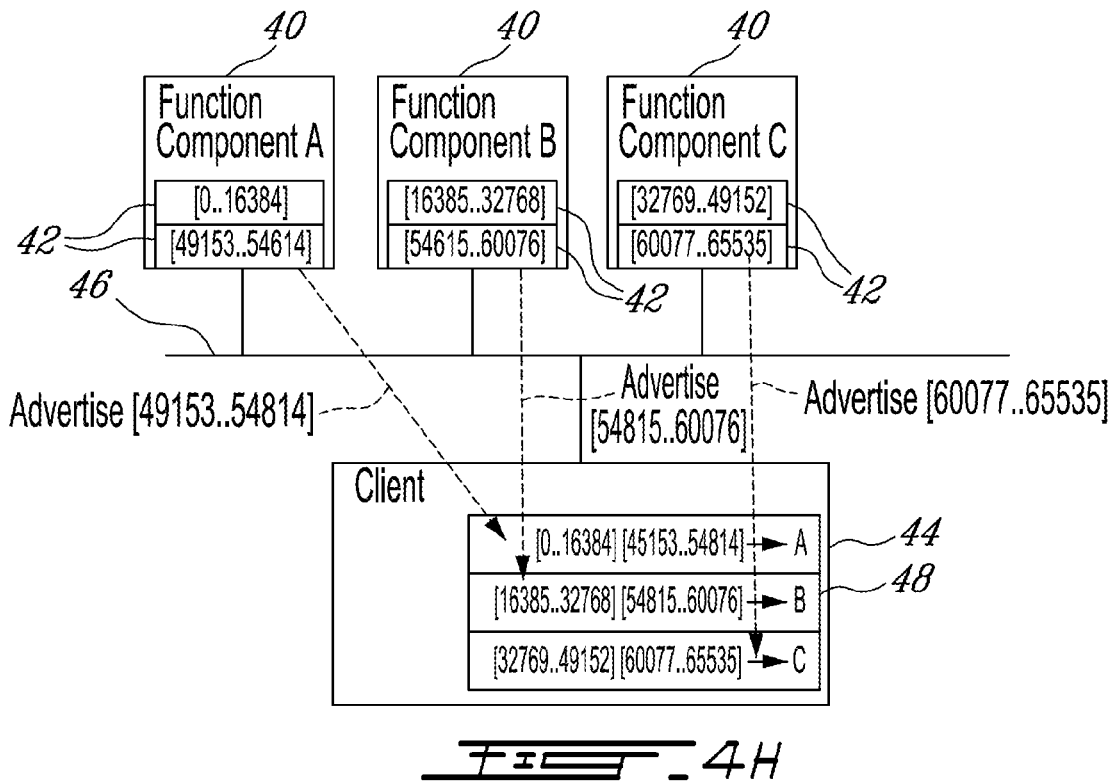
Figure 4I:
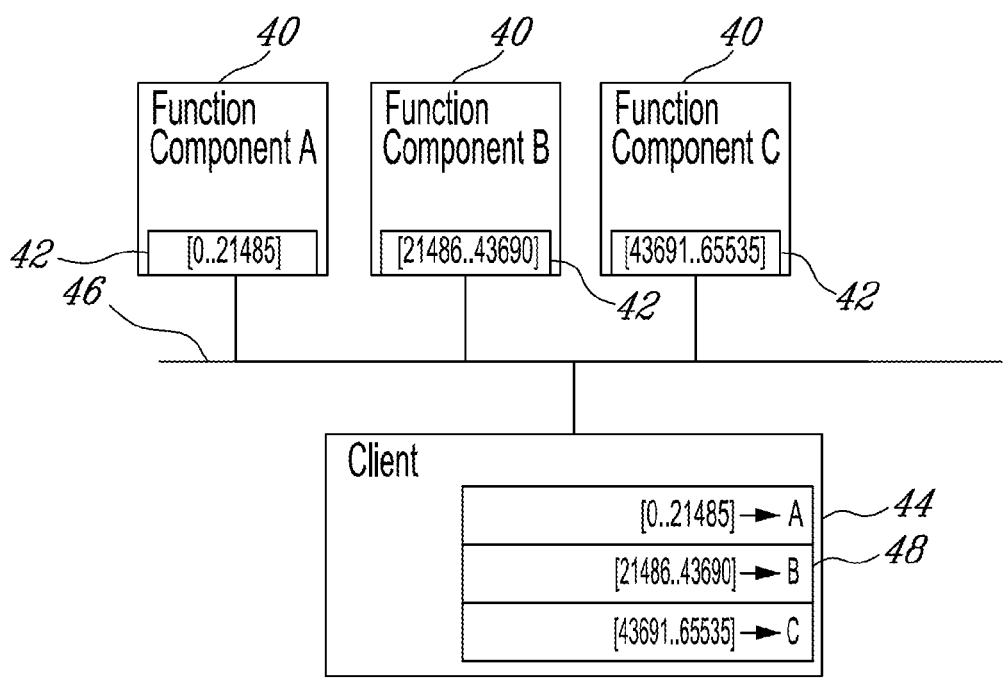

In Fig. 4H, Sheet 14 of 15, delete "Advertise [49153..54814]" and insert -- Advertise [49153..54614] --, therefor.

In Fig. 4H, Sheet 14 of 15, delete "[54815..60076]" and insert -- [54615..60076] --, therefor.

In Fig. 4H, Sheet 14 of 15, for Tag "44", Line 1, delete "[45153..54814]" and insert -- [49153..54614] --, therefor.

In Fig. 4H, Sheet 14 of 15, for Tag "48", Line 1, delete "[54815..60076]" and insert -- [54615..60076] --, therefor.